(12) United States Patent
Uchiyama

(10) Patent No.: US 6,768,866 B2
(45) Date of Patent: Jul. 27, 2004

(54) LENS-FITTED PHOTO FILM UNIT AND METHOD OF PRODUCING THE SAME

(75) Inventor: Keiji Uchiyama, Minami-Ashigara (JP)

(73) Assignee: Fuji Photo Co., Ltd., Kanagawa (JP)

( * ) Notice: Subject to any disclaimer, the term of this patent is extended or adjusted under 35 U.S.C. 154(b) by 0 days.

(21) Appl. No.: 10/437,236

(22) Filed: May 14, 2003

(65) Prior Publication Data
US 2003/0215228 A1 Nov. 20, 2003

(30) Foreign Application Priority Data

May 16, 2002 (JP) ........................................ 2002-141982
Oct. 25, 2002 (JP) ........................................ 2002-311441

(51) Int. Cl.⁷ ............................................. G03B 17/02
(52) U.S. Cl. ........................... 396/6; 396/176; 396/179; 396/535
(58) Field of Search ................................ 396/176, 179, 396/535, 6, 25, 29

(56) References Cited

U.S. PATENT DOCUMENTS

| 4,882,600 | A | * | 11/1989 | Van de Moere .............. 396/29 |
| 5,615,394 | A | | 3/1997 | Albrecht |
| 5,708,901 | A | | 1/1998 | Manabe |
| 5,784,652 | A | | 7/1998 | Schröder et al. |
| 5,815,740 | A | | 9/1998 | Wagner |
| 5,988,893 | A | | 11/1999 | Schröder et al. |
| 6,075,944 | A | | 6/2000 | Balling et al. |
| 6,078,749 | A | | 6/2000 | Rydelek et al. |
| 6,116,886 | A | | 9/2000 | Tasaka |
| 6,144,803 | A | | 11/2000 | Braid et al. |
| 6,154,609 | A | * | 11/2000 | Muramatsu et al. ........... 396/6 |
| 6,304,722 | B1 | | 10/2001 | Lawther et al. |
| 6,442,348 | B1 | | 8/2002 | Yamada |
| 6,449,430 | B1 | | 9/2002 | Tasaka et al. |
| 6,466,741 | B2 | * | 10/2002 | Uchiyama ...................... 396/6 |
| 6,549,727 | B1 | | 4/2003 | Kamata |
| 2001/0026689 | A1 | | 10/2001 | Ito |

FOREIGN PATENT DOCUMENTS

| EP | 0 380 118 A2 | 8/1990 |
| EP | 1 107 054 A1 | 6/2001 |
| JP | 09015693 | 1/1997 |
| JP | A 10-307324 | 11/1998 |
| JP | A 2000-321641 | 11/2000 |
| JP | A 2001-13639 | 1/2001 |

\* cited by examiner

Primary Examiner—David M. Gray
(74) Attorney, Agent, or Firm—Young & Thompson

(57) ABSTRACT

A lens-fitted photo film unit includes a main body pre-loaded with unexposed photo film. A front cover covers a front of the main body. An outer cover is secured to a front of the front cover. An auxiliary sheet is sandwiched between the front cover and the outer cover. In a preferred embodiment, a lens-fitted photo film unit is constituted by component part common use of a first lens-fitted photo film unit which includes a first main body, and a first outer cover for partially covering a front of the first main body. The lens-fitted photo film unit comprises a main body constituted by the first main body. An aperture stop changing unit is secured to a front of the main body. An outer cover has a different shape from the first outer cover, and partially covers a front of the main body and the aperture stop changing unit.

27 Claims, 10 Drawing Sheets

LENS-FITTED PHOTO FILM UNIT AND METHOD OF PRODUCING THE SAME

BACKGROUND OF THE INVENTION

1. Field of the Invention

The present invention relates to a lens-fitted photo film unit and a method of producing the same. More particularly, the present invention relates to a lens-fitted photo film unit which includes an outer cover and in which a change in the appearance or addition of an auxiliary device can be effected easily at a low cost, and a method of producing the lens-fitted photo film unit.

2. Description Related to the Prior Art

A lens-fitted photo film unit is pre-loaded with unexposed photo film. In the lens-fitted photo film unit, a main body contains the photo film. A front cover is attached to the front of the main body. A rear cover is attached to the rear of the main body.

Various types of the lens-fitted photo film unit have been known recently. The number of designs of appearance of the lens-fitted photo film unit has been increased. For example, one type has an outer cover as a member separate from the front cover. To change the design of the lens-fitted photo film unit having the outer cover, the appearance can be changed by replacing the outer cover with a different one. The purposes of the outer cover are decoration and neatness of the appearance of the product. Thus, the outer cover is formed with a color distinct from that of the front cover. The shape of the outer cover can be determined with a particular feature. Also, JP-A 10-307324 discloses a lens adapter for a camera. The lens-fitted photo film unit or camera is provided with the lens adapter as an auxiliary device for an optically special purpose.

To change the appearance of the lens-fitted photo film unit of the type described above, it is necessary to redesign molds for the outer cover to modify its shape. Furthermore, a different type of resin is used and require changes in the process of the production. This causes a rise in the manufacturing cost. Also, the lens adapter of the above known type, for example for the purpose of a telephotographic effect, is secured to the housing of the lens-fitted photo film unit in a subsequent process in the manufacture. The addition of such a special structure to the lens-fitted photo film unit causes a rise in the manufacturing cost.

U.S. Pat. No. 5,784,652 (corresponding to JP-A 9-197622) and U.S. Pat. No. 5,988,893 (corresponding to JP-A 9-230460) disclose the lens-fitted photo film unit in which the outer cover is formed from transparent resin. An auxiliary sheet of paper is sandwiched between an inner face of the outer cover and a mechanism for taking an exposure. So the auxiliary sheet can be observed through the outer cover externally. However, there are shortcomings in this prior art in that the cutting and bending of the auxiliary sheet in the manufacturing process must be highly precise for the purpose of preventing interference with a shutter mechanism, a winder mechanism or the like. The manufacturing process is excessively difficult. Also, the number of steps in the assembly may be greater.

SUMMARY OF THE INVENTION

In view of the foregoing problems, an object of the present invention is to provide a lens-fitted photo film unit which includes an outer cover and in which a change in the appearance can be effected easily, and a method of producing the lens-fitted photo film unit.

Another object of the present invention is to provide a lens-fitted photo film unit which includes an outer cover and in which addition of an auxiliary device can be effected easily at a low cost, and a method of producing the lens-fitted photo film unit.

In order to achieve the above and other objects and advantages of this invention, a lens-fitted photo film unit comprises a main body pre-loaded with unexposed photo film. A front cover covers a front of the main body. An outer cover is secured to at least one portion of a front of the front cover. An auxiliary sheet is disposed between the front cover and the outer cover.

The outer cover is transparent to keep the auxiliary sheet observable externally.

The outer cover is formed from resin.

Furthermore, indicating information is recorded on the auxiliary sheet and observable through the outer cover.

The auxiliary sheet is formed from paper.

Furthermore, an opening is formed in the auxiliary sheet. A provisional retention projection is formed to project from the front cover or the outer cover, for being fitted in the opening, to retain the auxiliary sheet on the front cover or the outer cover before the outer cover is secured to the front cover.

The provisional retention projection has a size larger than a size of the opening, and is forcibly pressed into the opening.

Furthermore, a positioning projection is formed to project from a rear of the outer cover. A positioning through hole is formed in the auxiliary sheet, for receiving insertion of the positioning projection, to position the auxiliary sheet on the outer cover.

Furthermore, a taking lens is incorporated in the main body, for passing object light toward the photo film. The auxiliary sheet includes a central opening formed therein and disposed in front of the taking lens.

Furthermore, an anti-slip projection is formed to project from the front cover. A first through hole is formed in the auxiliary sheet, for receiving insertion of the anti-slip projection. A second through hole is formed in the outer cover, disposed in front of the first through hole, for receiving insertion of the anti-slip projection, the anti-slip projection being adapted for preventing a slip during holding.

Furthermore, a flash unit is incorporated in the main body, having a flash emitter for emitting flash light. A flash charger is incorporated in the main body, externally operable, for charging the flash unit. The auxiliary sheet includes a flash charger opening formed therein and disposed in front of the flash charger.

Furthermore, a viewfinder is incorporated in the main body, and adapted to observe a photographic object. The auxiliary sheet includes a viewfinder recess formed therein and disposed in front of the viewfinder.

Consequently, a change in the appearance can be effected easily, because of the use of the auxiliary sheet disposed between the front cover and the outer cover.

According to another aspect of the invention, a lens-fitted photo film unit is constituted by component part common use of a first lens-fitted photo film unit including a first main body pre-loaded with unexposed photo film, and a first outer cover for covering at least one portion of a front of the first main body. The lens-fitted photo film unit comprises a main body, constituted by the first main body, and pre-loaded with unexposed photo film. An auxiliary unit is secured to a front of the main body. An outer cover has a different shape from the first outer cover, and covers at least one portion of a front of the main body and the auxiliary unit.

The first outer cover and the outer cover are formed by use of a mold set including a main core mold and a main cavity mold opposed to each other. First and second inserts are selectively fitted on a predetermined one of the main core mold and the main cavity mold, the first and second inserts being adapted to form respectively the first outer cover and the outer cover.

The first lens-fitted photo film unit further includes a first front cover for covering a front of the first main body, and for receiving attachment of the first outer cover. Furthermore, a front cover covers a front of the main body, and for receiving attachment of the outer cover. The front cover has a different shape from the first front cover.

The first front cover and the front cover are formed by use of a second mold set including a second main core mold and a second main cavity mold opposed to each other. Third and fourth inserts are selectively fitted on a predetermined one of the second main core mold and the second main cavity mold, the third and fourth inserts being adapted to form respectively the first front cover and the front cover.

Furthermore, a flash unit is incorporated in the main body, has a flash emitter for emitting flash light. The auxiliary unit includes a flash charger, incorporated in the main body, externally operable, for charging the flash unit.

In one preferred embodiment, the front cover is constituted by the first front cover.

The main body includes a photographic light path for introducing object light to the photo film. The auxiliary unit includes a stop-down panel, having a stop-down opening, externally shiftable between an offset position and a set position, wherein the stop-down panel, when in the offset position, is set away from the photographic light path, and when in the set position, sets the stop-down opening in the photographic light path, to stop down the object light.

The outer cover further includes a sliding slot formed therethrough. The stop-down panel is secured inside the outer cover, and further includes a selector projection, formed to project toward a front, inserted in the sliding slot, for being slid by external operation.

According to still another aspect of the invention, a producing method of producing a lens-fitted photo film unit is provided. At first, a front cover is secured to a main body pre-loaded with unexposed photo film. A standard outer cover is provided. A specific outer cover on which a photographing auxiliary device is disposed is provided. In producing a normal lens-fitted photo film unit, said standard outer cover is secured to said front cover, and in producing a specific lens-fitted photo film unit, said specific outer cover is secured to said front cover.

Consequently, addition of an auxiliary device can be effected easily at a low cost, because of the selective forming of the two types of the outer covers by use of simple molding.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
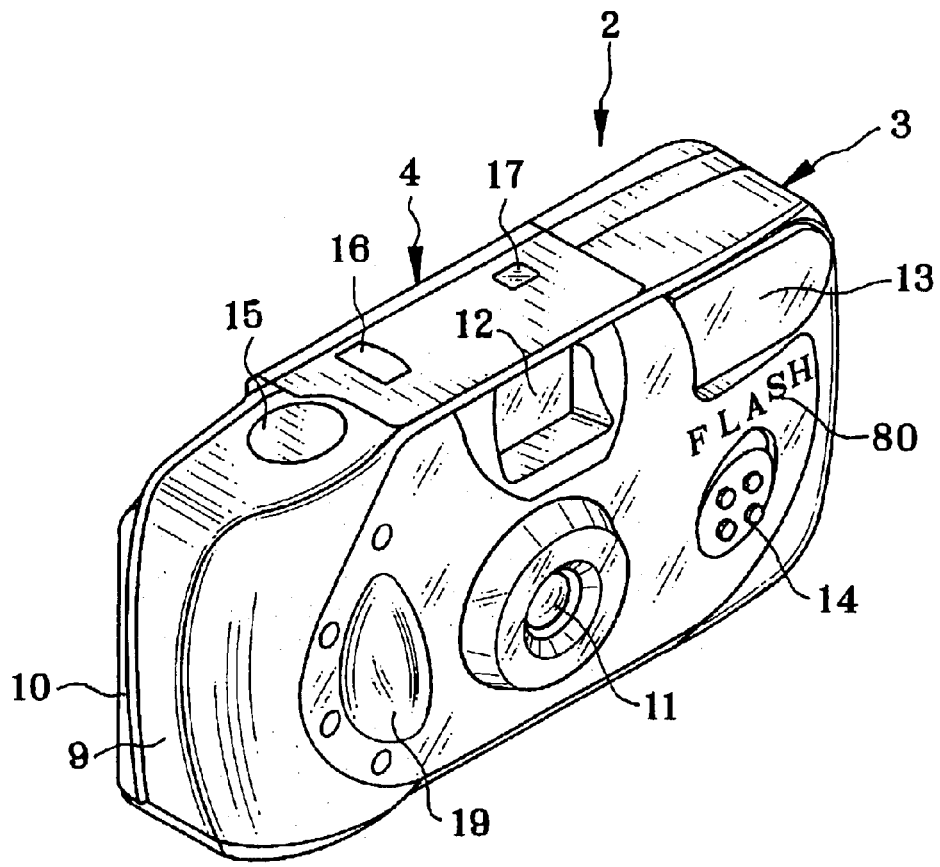
FIG. 1 is a perspective illustrating a lens-fitted photo film unit.
Figure 2:
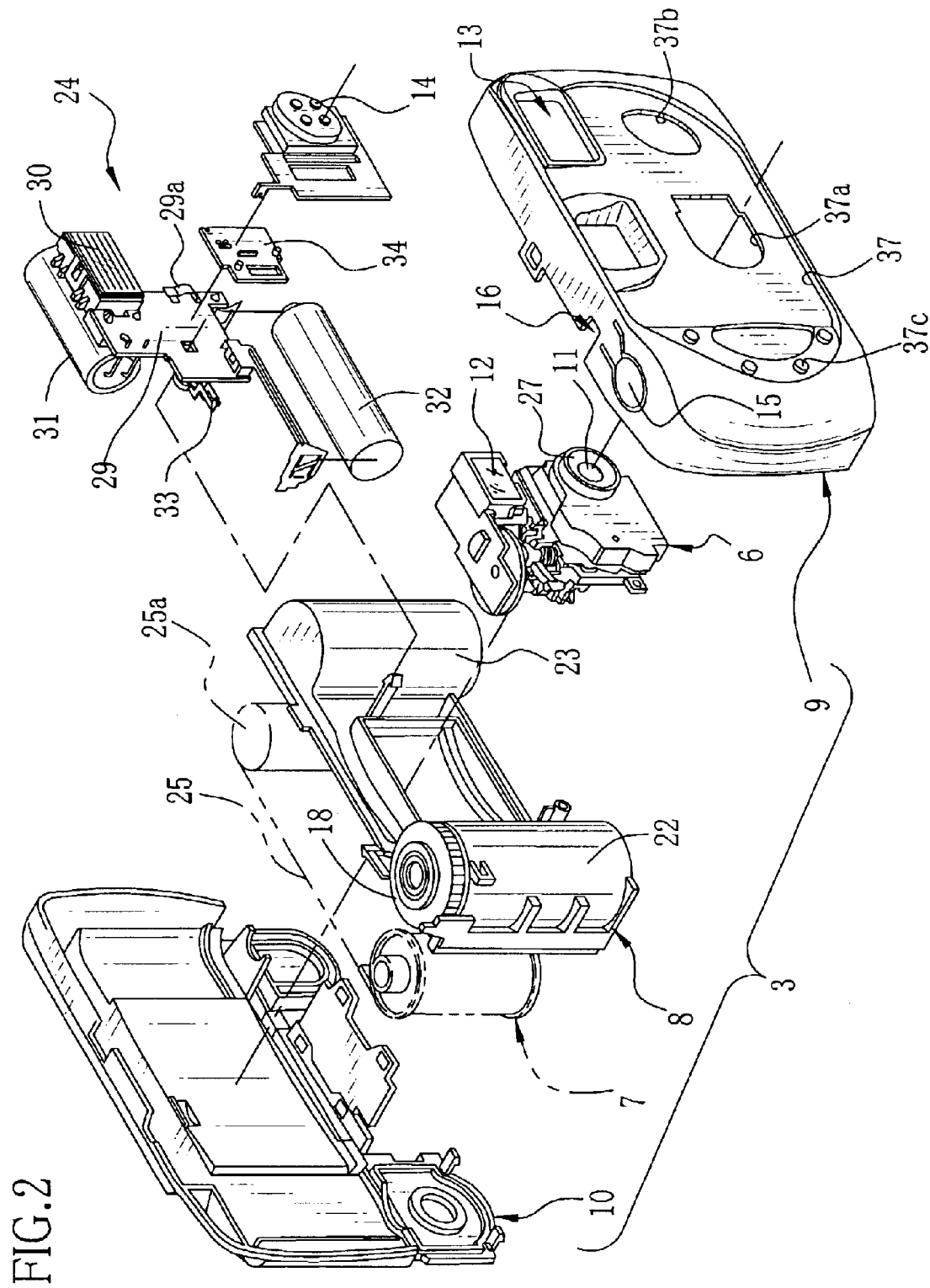
FIG. 2 is an exploded perspective illustrating the lens-fitted photo film unit.

In FIGS. 1 and 2, a lens-fitted photo film unit 2 is illustrated. A housing 3 of the lens-fitted photo film unit 2 is provided with a sticker or label 4 attached thereto. As depicted in FIG. 2, various elements constituting the housing 3 include parts molded from plastic material. The housing 3 has an exposure unit 6, a main body 8, a front cover 9 and a rear cover 10. The exposure unit 6 has mechanisms for taking an exposure. The main body 8 is loaded with a photo film cassette 7.

The front of the housing 3 is provided with a taking lens 11, an objective window of a viewfinder 12, a flash emission window 13 and a flash charger 14 as auxiliary unit. An upper side of the housing 3 is provided with a shutter release button 15, a counter window 16 and a readiness indicator 17. The rear of the housing 3 has a winder wheel 18, an objective window (not shown) of the viewfinder 12 and a grip 19. The sticker 4 has a belt shape attached to the surface of the housing 3, and extends on upper, rear and lower faces of the housing 3.

There are a cassette holder chamber 22 and a roll holder chamber 23 in the main body 8, on which the exposure unit 6 is disposed between those chambers. A flash unit 24 is secured to the main body 8 by engagement of hooks, and positioned between the exposure unit 6 and the roll holder chamber 23. The cassette holder chamber 22 is loaded with the photo film cassette 7. The roll holder chamber 23 is loaded with a photo film roll 25a, which has been produced by winding unexposed photo film 25 in a roll form after being drawn from the photo film cassette 7. The winder wheel 18 is disposed on an upper face of the cassette holder chamber 22 in a rotatable manner. A shaft portion protrudes from a lower face of the winder wheel 18, and is engaged with a spool of the photo film cassette 7 contained in the cassette holder chamber 22. When the winder wheel 18 is rotated in the counterclockwise direction, an exposed portion of the photo film 25 is wound into the photo film cassette 7.

The flash unit 24 is a unified component, and includes a flash circuit board 29. There are a flash emitter 30, a main capacitor 31, a battery 32, a sync switch 33 and the like connected with the flash circuit board 29. A charger support panel 34 is disposed in front of the flash circuit board 29, and supports the flash charger 14 in a slidable manner. When the flash charger 14 is slid up, a contact segment 29a on the flash circuit board 29 is depressed and turned on, to start charging the main capacitor 31. A shutter mechanism has a shutter blade, which is opened and shut. In synchronism with this, the sync switch 33 in the flash unit 24 is closed, to trigger emission of flash light.

The exposure unit 6 is provided with the taking lens 11, and includes a lens barrel 27, a shutter mechanism, a photo film one-frame advancing mechanism, a counter mechanism, a viewfinder and the like. The lens barrel 27 supports the taking lens 11, and has a photographic light path coming therethrough. The counter mechanism indicates a number of remaining available frames of the photo film.

Figure 3:
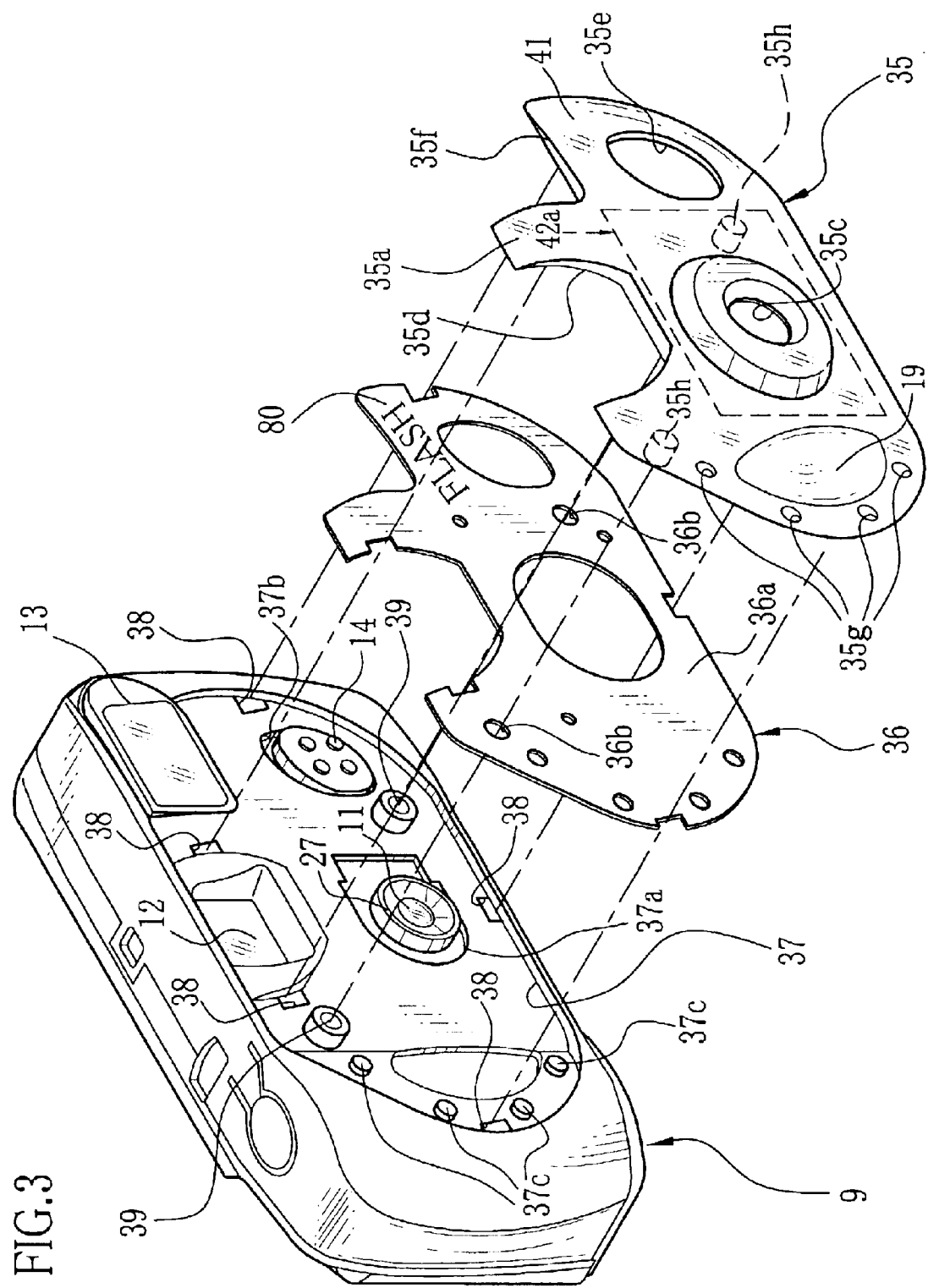
FIG. 3 is an exploded perspective illustrating the lens-fitted photo film unit with its outer cover and auxiliary sheet.

As illustrated in FIG. 3 in detail, a decorative outer cover 35 is secured to a front face of the front cover 9. A decorative auxiliary sheet 36 is sandwiched and kept positioned between the front cover 9 and the outer cover 35. A front face 36a of the auxiliary sheet 36 is provided with indicating information 80, which is printed in a full-color recording, and includes various decorative patterns for neat appearance of the front face, or a manufacturer s logo, or FLASH or other letters or indicia. As the outer cover 35 is transparent, the information on the front face 36a is visible externally. A recess 37 is formed with a small depth in the front of the front cover 9. Plural cutouts 38 are formed in the periphery of the recess 37, and are engageable with the outer cover 35. Plural bosses 39 project from the front cover 9 in the recess 37. A barrel receiving opening 37a or lens opening is formed in the center of the recess 37, receives insertion of the lens barrel 27 to allow the lens barrel 27 to protrude toward the front. A charger opening 37b is formed in the recess 37 beside the barrel receiving opening 37a, and receives insertion of the flash charger 14. Anti-slip projections 37c are formed to project from the recess 37, positioned on the right-side end of the body opposite to the flash charger 14, to extend toward the front for avoiding drop of the lens-fitted photo film unit when a user manually grasps it with a hand.

The outer cover 35 is formed from transparent plastic material, and is constituted by a transparent panel 35a with a small thickness. Plural hooks 35b project from a rear surface of the transparent panel 35a. See FIG. 4. The transparent panel 35a has a shape formed by elongating a circle in one direction, or has lateral side lines of arcs of a semi-circle and has upper and lower side lines that are straight. The outer cover 35 includes a central opening 35c, a viewfinder recess 35d, a charger opening 35e and a flash window recess 35f. The central opening 35c is disposed at the center of the transparent panel 35a, and causes the taking lens 11 to appear externally. The viewfinder recess 35d is disposed above the central opening 35c, and uncovers the viewfinder 12. The charger opening 35e is disposed beside the central opening 35c, and uncovers the flash charger 14. The flash window recess 35f is disposed above the charger opening 35e, and uncovers the flash emission window 13. The shape of the transparent panel 35a is nearly the same as that of the recess 37 of the front cover 9.

The grip 19 is a portion defined by a concavely curved surface, and disposed in the transparent panel 35a opposite to the charger opening 35e. Through holes 35g are formed in the outer cover 35, and disposed near to the periphery of the grip 19. The anti-slip projections 37c of the front cover 9 are inserted in the through holes 35g, and extend toward the front through the transparent panel 35a.

Figure 4:
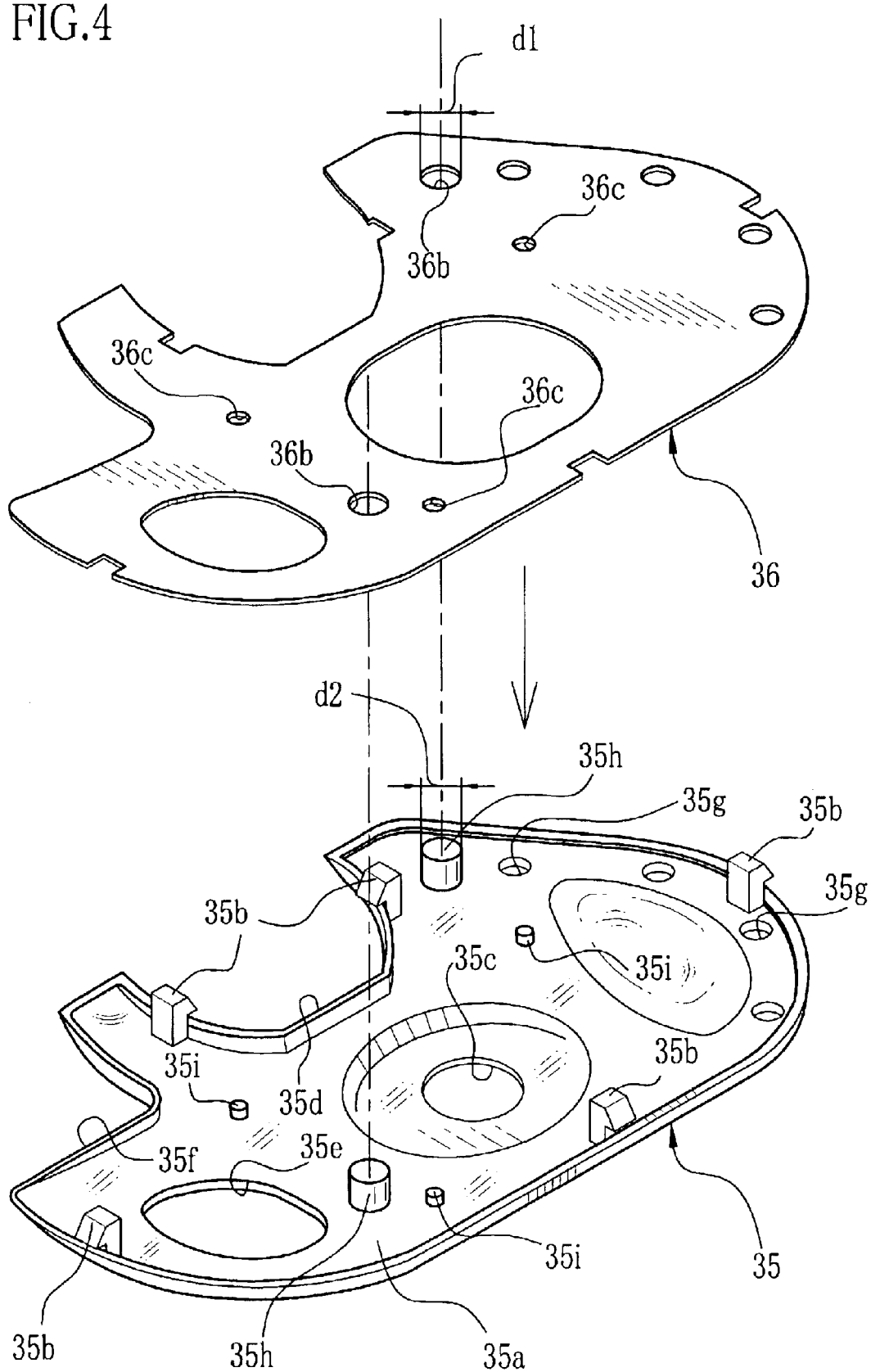
FIG. 4 is an exploded perspective illustrating the outer cover and auxiliary sheet.

In FIG. 4, the rear of the outer cover 35 is illustrated. There are plural provisional retention projections 35h and plural positioning projections 35i projecting from the transparent panel 35a in addition to the hooks 35b as one molded piece. The provisional retention projections 35h are inserted in holes at the bosses 39 of the front cover 9. Thus, the outer cover 35 is secured to the front cover 9 firmly.

The auxiliary sheet 36 has nearly the same shape as the outer cover 35 and the recess 37 in the front cover 9, but has a size smaller than the recess 37 not to extend to the outside of the recess 37. Plural openings 36b and plural positioning through holes 36c are formed in the auxiliary sheet 36. The openings 36b have a diameter d1 that is smaller than a diameter d2 of the provisional retention projections 35h.

In a process to combine the outer cover 35 and the auxiliary sheet 36, the outer cover 35 is placed on a station by directing its front face downwards, as illustrated in FIG. 4. The auxiliary sheet 36 is handled by a robot arm, and moved toward the outer cover 35 downwards in a straight manner. The robot arm presses the auxiliary sheet 36 to the outer cover 35 to position the openings 36b at the through holes 35g. The provisional retention projections 35h are forcibly pressed into the openings 36b, and come to protrude in the rear of the auxiliary sheet 36. At the same time, the positioning projections 35i come through the positioning through holes 36c. Note that a diameter d1 of the openings 36b is predetermined smaller than a diameter d2 of the provisional retention projections 35h. Thus, the auxiliary sheet 36 can be combined with the outer cover 35 in a firmly engaged state of the provisional attachment before the transfer to next process.

In the succeeding process, the outer cover 35 with the auxiliary sheet 36 is grasped by a second robot arm, and moved straight toward the front cover 9. The hooks 35b are caused to engage with the cutouts 38 in the front cover 9. The provisional retention projections 35h are inserted in the bosses 39, to secure the outer cover 35 tightly to the front cover 9. Also, the auxiliary sheet 36 is sandwiched between the outer cover 35 and the front cover 9, and kept retained. Note that dimensions of the recess 37 are predetermined in consideration of thicknesses of the outer cover 35 and the auxiliary sheet 36 to minimize a difference in the level along a borderline between front faces of the front cover 9 and the outer cover 35.

Figure 5C:
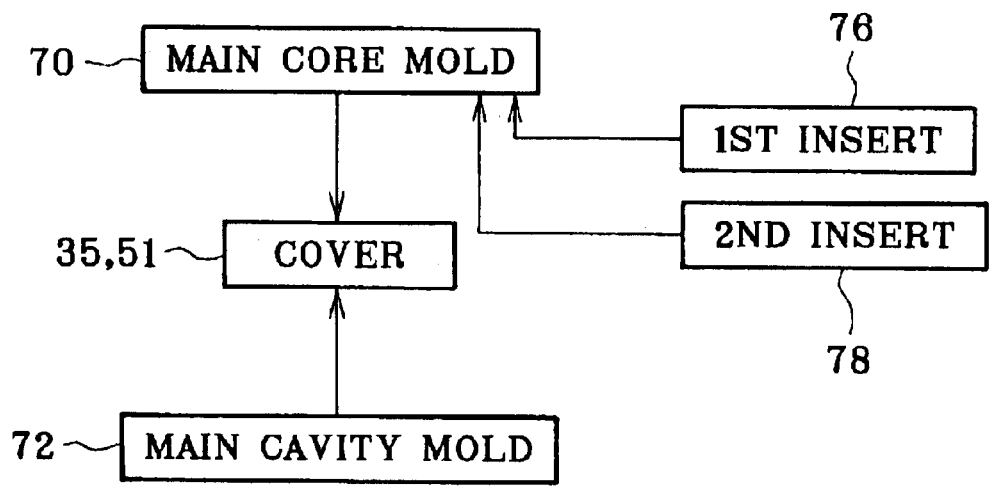
FIG. 5C is an explanatory view illustrating a set of molds for forming outer covers of two types.
Figure 5A:
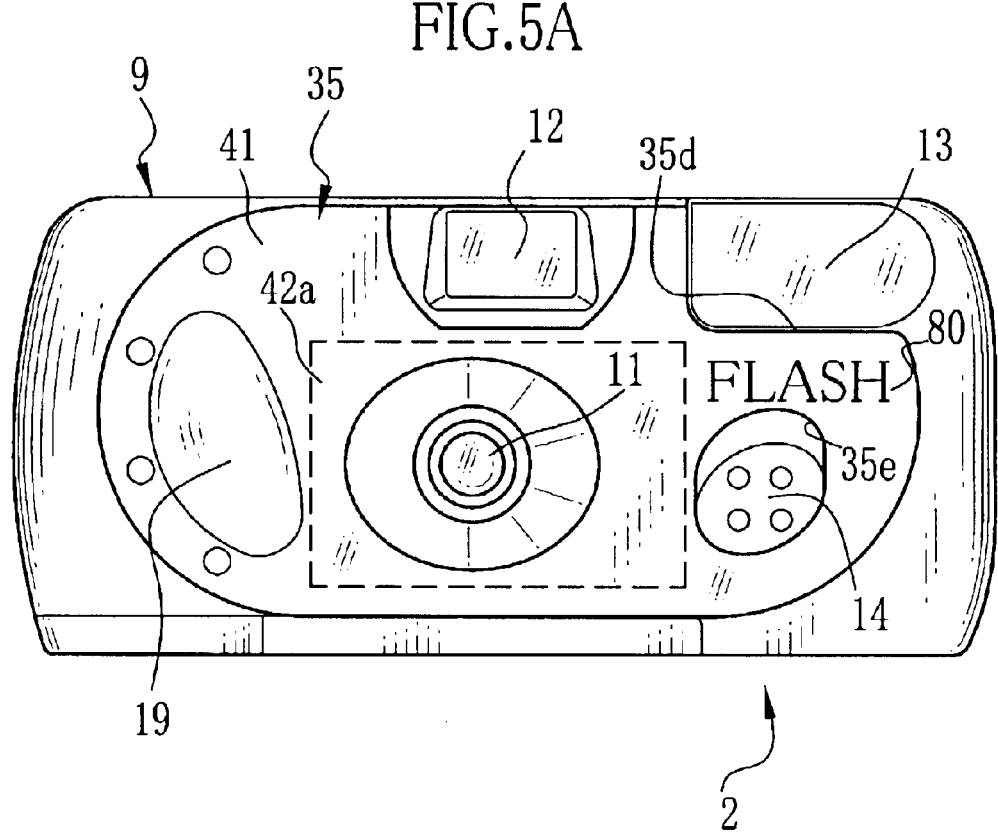
FIG. 5A is a front elevation illustrating the lens-fitted photo film unit.
Figure 5B:
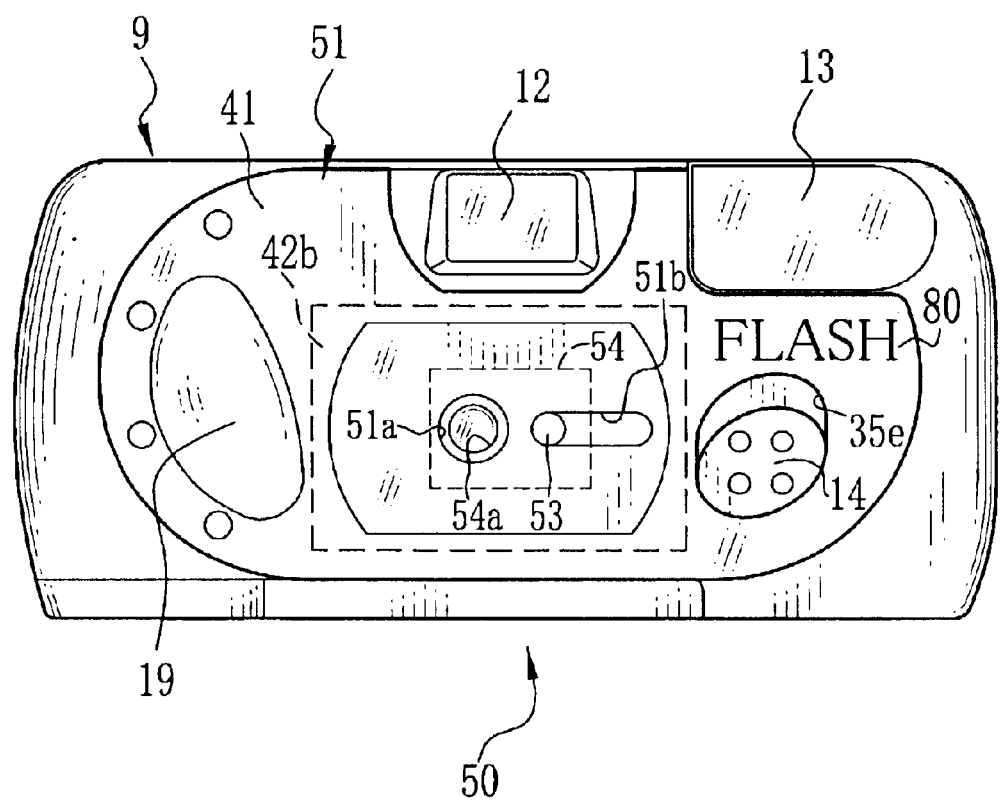
FIG. 5B is a front elevation illustrating a second lens-fitted photo film unit to which an aperture stop changing unit is added.

In FIG. 5A, the lens-fitted photo film unit 2 is illustrated. In FIG. 5B, a lens-fitted photo film unit 50 as a variant is illustrated in comparison with the lens-fitted photo film unit 2. Elements in the lens-fitted photo film unit 50 similar to those in the lens-fitted photo film unit 2 are designated with identical reference numerals.

Figure 5D:
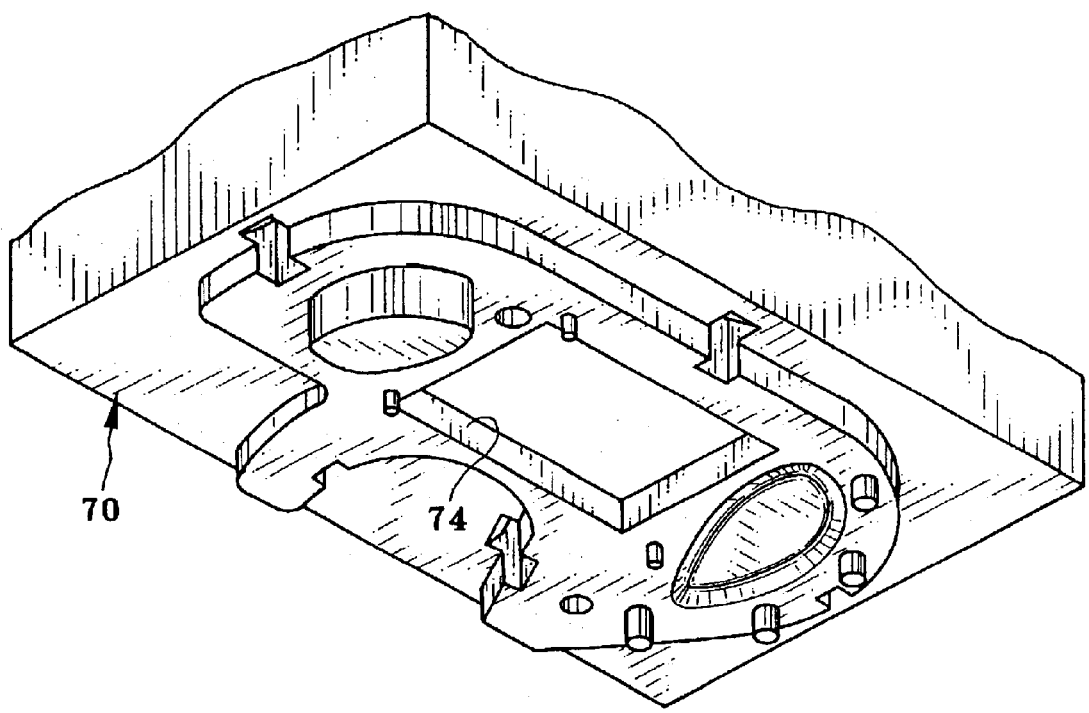
FIG. 5D is a perspective illustrating a main core mold included in the mold set.
Figure 5E:
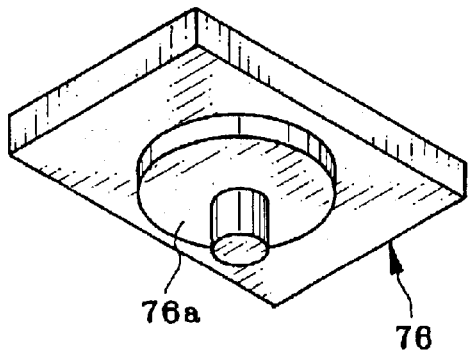
FIGS. 5E and 5F are perspectives illustrating respectively first and second inserts used for forming the first and second outer covers.
Figure 5F:
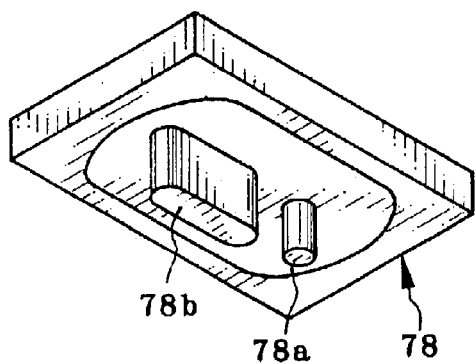

As illustrated in FIGS. 5A and 5B, each of the outer cover 35 and an outer cover 51 is constituted by a main region 41 and an insert region 42a or 42b. The insert regions 42a and 42b are indicated by the broken lines in the drawings. To form a contour and common portions of the outer covers 35 and 51 in the main region 41, a combination of a main core mold 70 and a main cavity mold 72 is used in a mold set. See FIG. 5C. A selected one of first and second inserts 76 and 78 is fixedly set in an insert receiving recess 74. See FIGS. 5D, 5E and 5F. The first insert 76 is used to form the outer cover 35 in the insert region 42a. The second insert 78 is used to form the outer cover 51 in the insert region 42b. The shape of the outer cover 35 in the insert region 42a is distinct from that of the outer cover 51 in the insert region 42b by the selective use of the first and second inserts 76 and 78.

The lens-fitted photo film unit 50 in FIG. 5B has a feature of changing over an aperture stop in a distinct manner from the lens-fitted photo film unit 2 which lacks this changeable structure. However, the main core mold 70 and the main cavity mold 72 are used commonly for producing the front cover 9, in addition to which a number of other parts are common between those. For example, there are common elements including the taking lens 11, the viewfinder 12, the flash emission window 13, the flash charger 14 and the grip 19 in the front of the outer cover 51.

Figure 6:
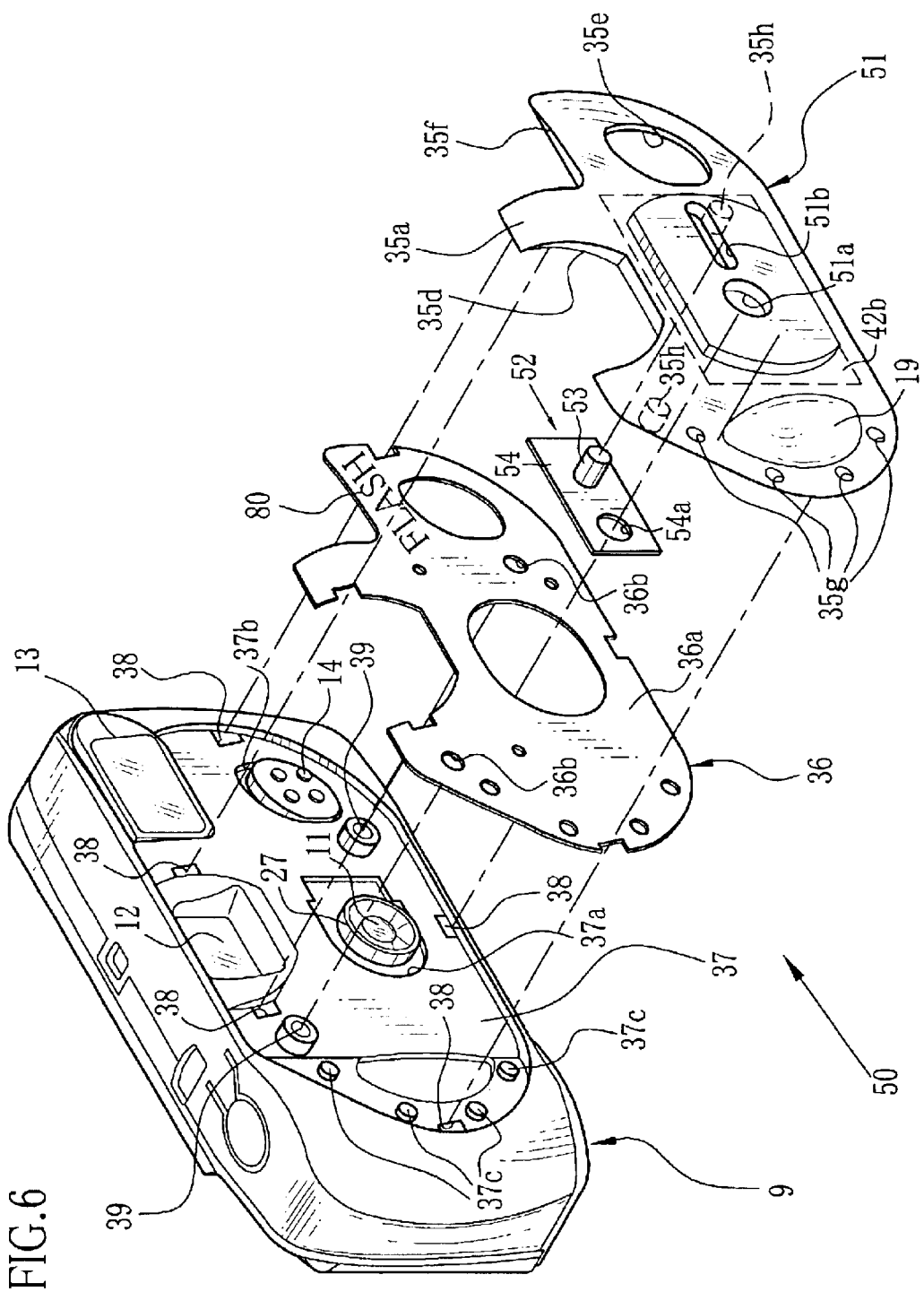
FIG. 6 is an exploded perspective illustrating the second lens-fitted photo film unit with the aperture stop changing unit.

To form the outer cover 51, the second insert 78 is selected for the insert region 42b. For the elements also relevant to the outer cover 35 or the main region 41, see the description heretofore. In FIGS. 5A, 5B and 6, there are a central opening 51a and a sliding slot 51b formed in the outer cover 51 and disposed in the insert region 42b. An aperture stop changing unit 52 as auxiliary unit is constituted by a selector projection 53 and a stop-down panel 54. The selector projection 53 is inserted in the sliding slot 51b in a slidable manner. A stop-down opening 54a is formed in the stop-down panel 54. When the selector projection 53 is moved horizontally, the stop-down panel 54 is slid between an offset position and a set position. The stop-down panel 54, when in the offset position, is away from the central opening 51a without stopping down, and when in the set position, sets the stop-down opening 54a at the central opening 51a to stop down the aperture stop opening.

The operation of the above construction is described now. To change the appearance of the lens-fitted photo film unit 2, it is possible to change a pattern, letters, numbers, indicia or other information printed on the auxiliary sheet 36. When the auxiliary sheet 36 is inserted in the lens-fitted photo film unit 2 according to the above-described processes, the lens-fitted photo film unit 2 can be provided with an altered appearance. This is advantageous in changing the product appearance with great ease and at a low cost without changing the assembling process or selection of the resin material. As the provisional retention projections 35h are tightly inserted in the openings 36b in positioning the auxiliary sheet 36, the assembling operation is possible in a smooth manner without an offset state of the auxiliary sheet 36.

To provide the lens-fitted photo film unit 2 with a structure for changing over the aperture stop, the first insert 76 in the main core mold 70 is replaced with the second insert 78 for the insert region 42b of FIG. 5B, to form the outer cover 51. Then the selector projection 53 of the aperture stop changing unit 52 is inserted in the sliding slot 51b in the outer cover 51. The outer cover 51 has a shape the same as the outer cover 35 in the main region 41 except for the insert region 42b, and is assembled in the same manner as the outer cover 35. Thus, the lens-fitted photo film unit is obtained with the aperture stop changing structure. It is possible to incorporate such an additional structure in a product at a low cost and easily without considerable changes in the assembling process.

Figure 7:
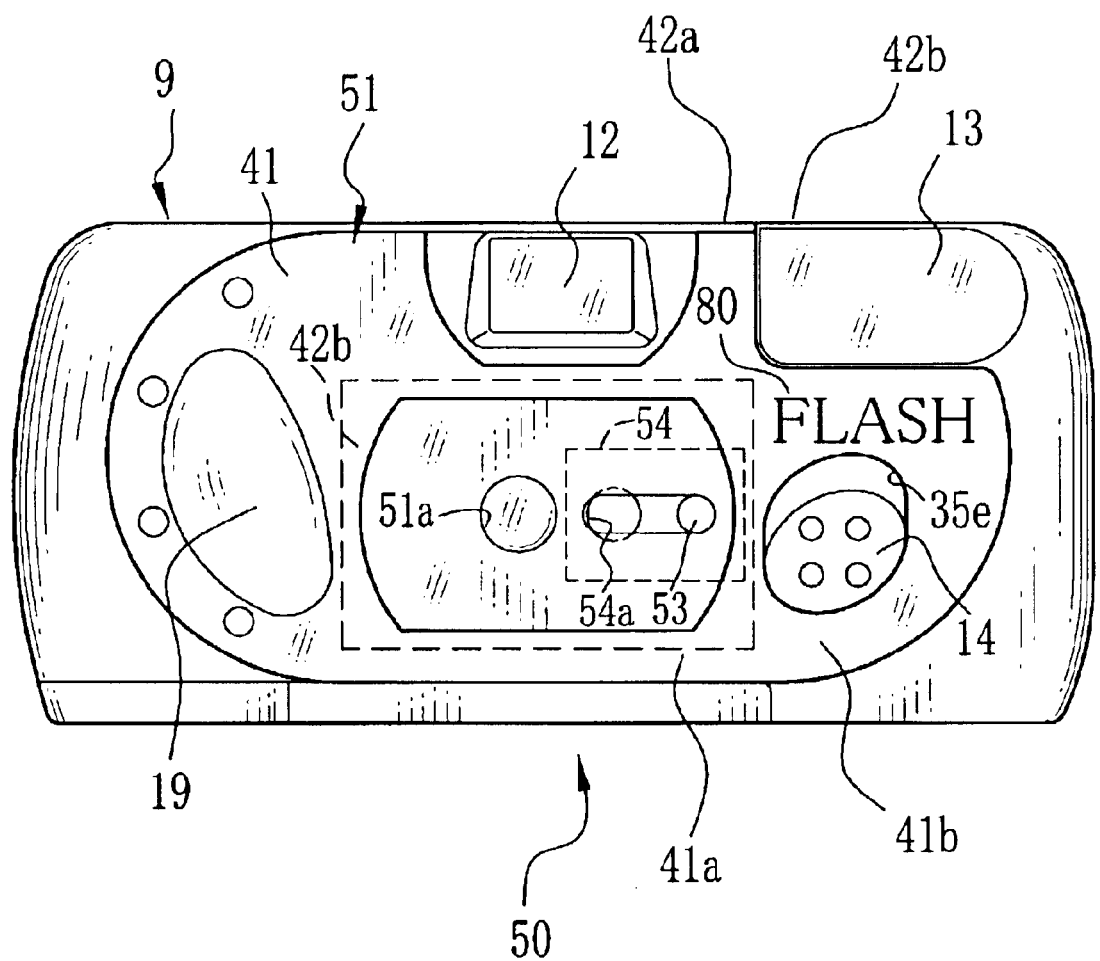
FIG. 7 is a front elevation illustrating the same as FIG. 6 but in a large aperture stop state.

In FIG. 5B, the selector projection 53 is shifted to the right side. Then the stop-down panel 54 is so positioned to set the stop-down opening 54a at the central opening 51a. The aperture stop opening is changed over and stopped down according to a size of the stop-down opening 54a. In FIG. 7, the selector projection 53 is shifted to the left side. The stop-down panel 54 is set away from the central opening 51a, which appears fully, and sets a photographic light path in a large aperture stop state.

For the outer cover 35, a subcore 76a in the first insert 76 is effective to form the central opening 35c in the insert region 42a in order to produce the lens-fitted photo film unit 2 without the aperture stop changing structure. For the outer cover 51, subcores 78a and 78b in the second insert 78 are effective to form the central opening 51a and the sliding slot 51b in the insert region 42b in order to produce the lens-fitted photo film unit 50 without the aperture stop changing structure. The use of the first and second inserts 76 and 78 is effective in selective production of the two types. As the main core mold 70 and the main cavity mold 72 are used commonly between the two types, the manufacturing cost can be reduced. The simple addition of the selector projection 53 and the stop-down panel 54 makes it possible to add the aperture stop changing structure. The rise in the manufacturing cost can be small.

In the lens-fitted photo film unit 50, a decorative auxiliary sheet is sandwiched between the outer cover 51 and the front cover 9 in a similar manner to the lens-fitted photo film unit 2. The auxiliary sheet 36 of the above-described example can be used between the lens-fitted photo film unit 2 of the type without the changeable structure and the lens-fitted photo film unit 50 of the type with the changeable aperture stop, because of shapes of various common portions between the outer covers 35 and 51. It is to be noted that details of the mold set with changeable inserts are described in U.S. Pat. No. 6,116,886 (corresponding to JP-A 10-260509).

In the above embodiment, only the outer cover 35 is replaced by the outer cover 51. However, a variant of the front cover 9 can be formed for the purpose of producing the alternative type of lens-fitted photo film unit. In the above embodiment, the aperture stop changing unit 52 is added. However, an additional structure for any suitable purpose may be incorporated in a lens-fitted photo film unit.

Note that it is alternatively possible to form projections on the front cover 9, and insert those into the openings 36b forcibly to position the auxiliary sheet 36 in a provisional manner. After this, the outer cover 35 can be secured to the front cover 9 to retain the auxiliary sheet 36. In addition, the projections on the front cover 9 to be used with the openings 36b may be the bosses 39. Those projections are cylindrical of course, such projections may have any suitable shape as viewed in cross section. However, it is preferable that the projections should have a diameter slightly longer than that of the openings 36b to be combined.

Figure 8A:
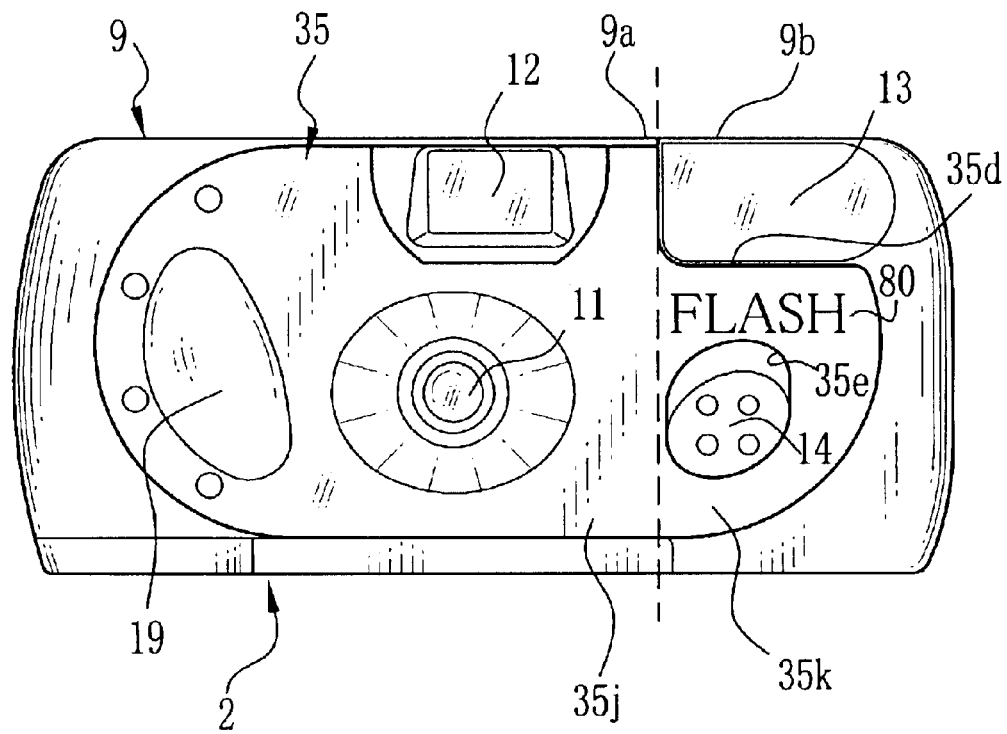
FIG. 8A is a front elevation illustrating the first type of the lens-fitted photo film unit.
Figure 8B:
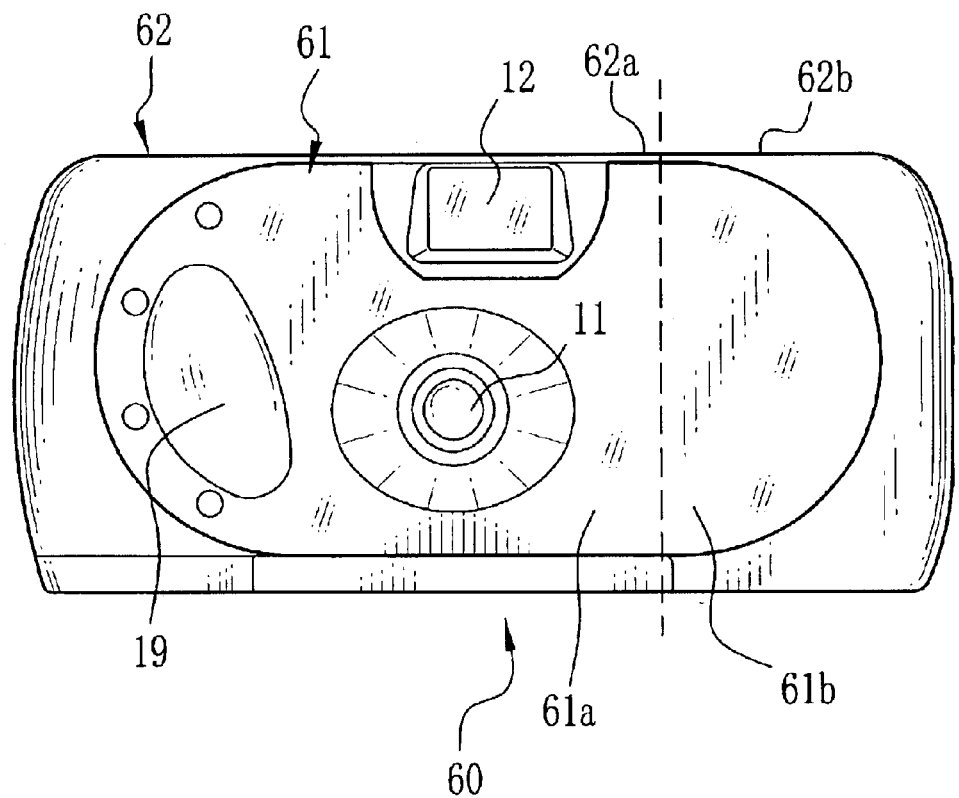
FIG. 8B is a front elevation illustrating an alternate lens-fitted photo film unit of a daylight outdoor type.

In the above embodiment, the flash unit 24 is included in the lens-fitted photo film unit. Another preferred embodiment is described now, in which two types of products are distinct according to existence or lack of the flash unit 24. In FIG. 8A, the lens-fitted photo film unit 2 is illustrated. In contrast with this, FIG. 8B illustrates a lens-fitted photo film unit 60 of a daylight outdoor type having no flash unit. Elements similar to those of the above embodiment are designated with identical reference numerals.

The lens-fitted photo film unit 60 is the daylight outdoor type without the flash unit in a distinct manner from the lens-fitted photo film unit 2 which includes the flash unit. However, mold sets are used commonly for producing a number of other parts that are common between those. For example, there are common elements including the taking lens 11, the viewfinder 12 and the grip 19 despite differences between a front cover 62 and the front cover 9 and between an outer cover 61 and the outer cover 35. In contrast, the front cover 62 does not have a cutout for the flash emission window 13. The outer cover 61 does not have the charger opening 35e for the flash charger 14. Instead of those, flat portions exist because of the daylight outdoor type of the lens-fitted photo film unit 60. The outer cover 61 does not have the viewfinder recess 35d for the flash emission window 13, and thus has lateral side lines of continuous arcs of a semi-circle. In comparison, a major portion 62a of the front cover 62 beside the flash emission window 13 is shaped equally to a major portion 9a of the front cover 9. An outer major portion 61a of the outer cover 61 is shaped equally to an outer major portion 35j of the outer cover 35. However, a side end portion 62b of the front cover 62 about the flash emission window 13 is partially different from a side end portion 9b of the front cover 9. An outer side end portion 61b of the outer cover 61 under the flash emission window 13 is partially different from an outer side end portion 35k of the outer cover 35.

Each of the front covers 9 and 62 is constituted by a main region and an insert region. To form a contour and common portions of the front covers 9 and 62 in the main region, a combination of a main core mold and a main cavity mold is used. A selected one of first and second inserts is fixedly set in the main core mold. The first insert is used to form the front cover 9 in its insert region. The second insert is used to form the front cover 62 in its insert region. Furthermore, the outer covers 35 and 61 are produced by a similar use of a set of molds.

To mold the front cover 9 by the injection molding, inserts with a subcore and a subcavity in combination are opposed to each other and used for forming the side end portion 9b having the flash emission window 13. To mold the front cover 62, inserts with a subcore and a subcavity in combination are opposed to each other and used for forming the side end portion 62b where the flash emission window 13 is omitted. Similarly, the outer major portions 35j and 61a of the outer covers 35 and 61 are formed from a main core mold and main cavity mold in combination. The outer side end portions 35k and 61b that are distinct from each other are formed from respectively inserts with a subcore and a subcavity opposed to each other. The number of the inserts combined with the main molds is considerably small. It is possible to lower the manufacturing cost by use of common parts and the common main molds. Also in the lens-fitted photo film unit 60, the auxiliary sheet is sandwiched between the outer cover 61 and the front cover 62. It may be possible to use the same auxiliary sheet 36 between the flash type and the daylight outdoor type, because most of the important portions of the outer cover 61 are shaped equally to those of the outer cover 35. It is to be noted that details of the mold set with such changeable inserts are described in U.S. Pat. No. 6,116,886 (corresponding to JP-A 10-260509).

Figure 9A:
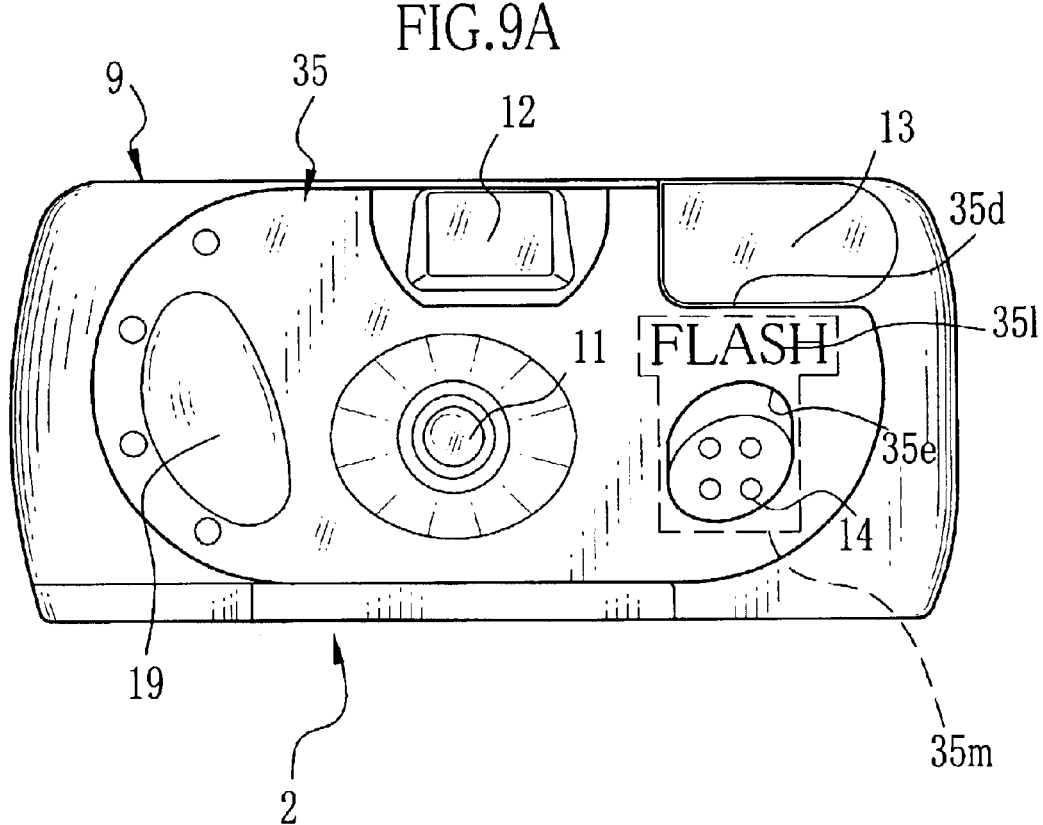
FIG. 9A is a front elevation illustrating the first type of the lens-fitted photo film unit but provided with letter projections.
Figure 9B:
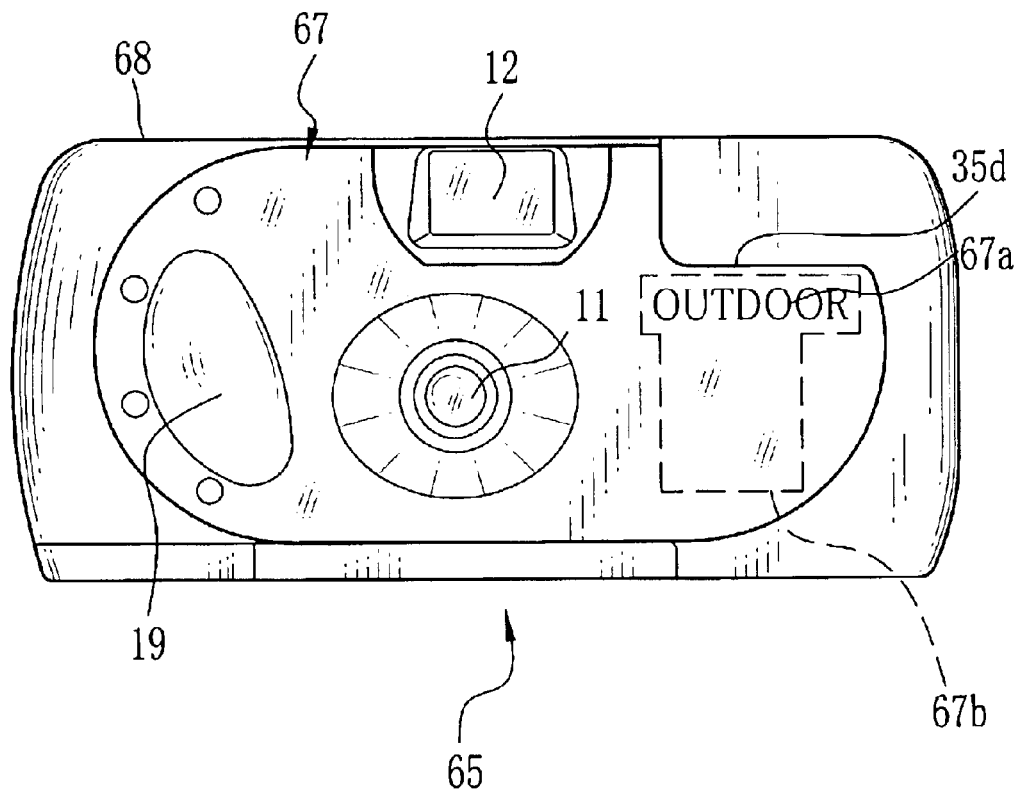
FIG. 9B is a front elevation illustrating an alternate lens-fitted photo film unit similar to FIG. 8B but associated that of FIG. 9A.

A flash type and a daylight outdoor type can be produced in a manner different from the above. In FIG. 9A, the lens-fitted photo film unit 2 of the flash type is illustrated. In contrast with this, FIG. 9B illustrates a lens-fitted photo film unit 65 of a daylight outdoor type having no flash unit. Elements similar to those of the above embodiment are designated with identical reference numerals.

In FIG. 9A, letter projections 35l are formed on the outer cover 35 of the lens-fitted photo film unit 2, and disposed higher than the charger opening 35e for the flash charger 14 for the shape of letters FLASH to indicate the flash type. In FIG. 9B, an outer cover 67 of the lens-fitted photo film unit 65 of the daylight outdoor type is depicted. Letter projections 67a are formed on the outer cover 67 of the lens-fitted photo film unit 65, for the shape of letters OUTDOOR to indicate the daylight outdoor type. A front cover 68 of the lens-fitted photo film unit 65 is the same as the front cover 62. For further information, see the description of the front cover 62.

To mold the outer cover 35 by the injection molding, inserts with a subcore and a subcavity in combination are opposed to each other and used for forming a charger portion 35m indicated by the broken line in FIG. 9A. To mold the outer cover 67, inserts with a subcore and a subcavity in combination are opposed to each other and used for forming a portion 67b indicated by the broken line in FIG. 9B. The remaining major portions of the outer covers 35 and 67 are formed from a main core mold and main cavity mold in combination. The charger portion 35m in the outer cover 35 includes the letter projections 35l and peripheral portions of the charger opening 35e. The portion 67b in the outer cover 67 includes the letter projections 67a and peripheral portions about a position which would be a flash charger portion. Areas of those different regions are smaller than those according to the above embodiment of FIGS. 8A and 8B. Accordingly, the manufacturing cost can be lowered by use of common parts and the common main molds only with the selectable inserts.

Furthermore, the present invention is applicable to other structures of parts of lens-fitted photo film units. A flash charger button may be included in a front cover or outer cover. Inserts combinable in main molds may be changed over to select one of existence and lack of the flash charge button. Also, a front cover can be commonly shaped in combination with outer covers shaped differently from one another. Letter projections may be formed by use of inserts. In addition, an outer cover may be so disposed as not to interfere with the flash emission window or the flash charger regarding to the shape or operation. Only the inserts for the flash emission window and the flash charger button may be changed over. The auxiliary cover may be used commonly.

It is to be noted that, in the present invention, the auxiliary sheet 36 may be omitted from the lens-fitted photo film unit. In the absence of the auxiliary sheet 36, main molds and inserts may be used for the purpose of changing the shape of an outer cover to modify the appearance of products.

In the above embodiments, the auxiliary sheet 36 is formed from paper. However, the auxiliary sheet 36 may be a piece of cardboard or the like. The auxiliary sheet 36 can be any one of a sheet, film and plate, and may be formed from resin or other suitable material.

In the above embodiments, the first or second insert 76 or 78 is set inside the main core mold 70, and is positioned directly face to face with the main cavity mold 72. However, a pair of opposed inserts may be used for the purpose of forming one portion of a molded product. A first one of the inserts may be set inside a main core mold. A second one of the inserts may be set inside a main cavity mold in a position opposed to the set position for the first insert. Furthermore, a single insert may be used for a set of a main core mold and a main cavity mold, and may be set inside a main cavity mold without using an insert in the main core mold, and can be positioned directly face to face with the main core mold.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A lens-fitted photo film unit comprising:
a main body pre-loaded with unexposed photo film;
a front cover for covering a front of said main body;
an outer cover secured to at least one portion of a front of said front cover;
an auxiliary sheet disposed between said front cover and said outer cover;
an opening formed in said auxiliary sheet; and
a provisional retention projection, formed to project from at least one of said front cover and said outer cover, the provisional retention projection and the opening in the auxiliary sheet being arranged so that when the outer cover is secured to the front cover, the provisional retention projection passes through said opening.

2. A lens-fitted photo film unit as defined in claim 1, wherein said outer cover is transparent to keep said auxiliary sheet observable externally.

3. A lens-fitted photo film unit as defined in claim 2, wherein said outer cover is formed from resin.

4. A lens-fitted photo film unit as defined in claim 3, further comprising indicating information recorded on said auxiliary sheet and observable through said outer cover.

5. A lens-fitted photo film unit as defined in claim 4, wherein said auxiliary sheet is formed from paper.

6. A lens-fitted photo film unit as defined in claim 1, wherein said provisional retention projection has a size larger than a size of said opening, and is forcibly pressed into said opening.

7. A lens-fitted photo film unit as defined in claim 6, further comprising:
a positioning projection formed to project from a rear of said outer cover; and
a positioning through hole, formed in said auxiliary sheet, for receiving insertion of said positioning projection, to position said auxiliary sheet on said outer cover.

8. A lens-fitted photo film unit as defined in claim 7, further comprising a taking lens, incorporated in said main body, for passing object light toward said photo film;
said auxiliary sheet includes a central opening formed therein and disposed to surround said taking lens.

9. A lens-fitted photo film unit as defined in claim 8, further comprising:
an anti-slip projection formed to project from said front cover;
a first through hole, formed in said auxiliary sheet, for receiving insertion of said anti-slip projection; and
a second through hole, formed in said outer cover, for receiving insertion of said anti-slip projection projecting from said first through hole.

10. A lens-fitted photo film unit as defined in claim 8, further comprising:
a flash unit, secured to said main body, having a flash emitter for emitting flash light;
a flash operation member, externally operable through said front cover, for turning on said flash unit;
wherein said auxiliary sheet includes an opening so positioned that said flash operation member is accessed therein.

11. A lens-fitted photo film unit as defined in claim 8, further comprising a viewfinder, secured to said main body, and adapted to observe a photographic object;
wherein said auxiliary sheet includes a viewfinder recess so positioned that said viewfinder is disposed therein.

12. A lens-fitted photo film unit as defined in claim 8, further comprising:
a photographic light path, formed through said main body, for introducing said object light to said photo film; and
a stop-down panel, disposed between said auxiliary sheet and said outer cover, having a stop-down opening, externally shiftable between an offset position and a set position, wherein said stop-down panel, when in said offset position, is set away from said photographic light path, and when in said set position, sets said stop-down opening in said photographic light path, to stop down said object light.

13. A lens-fitted photo film unit as defined in claim 12, wherein said outer cover further includes a sliding slot;
said stop-down panel further includes a selector projection inserted in said sliding slot in a slidable manner by external operation.

14. A producing method of producing a lens-fitted photo film unit, comprising steps of:
providing a main body pre-loaded with unexposed photo film;
providing a standard front cover;
providing a specific front cover on which a photographing auxiliary device is provided;
in producing a normal lens-fitted photo film unit, securing said standard front cover to said main body, and in producing a specific lens-fitted photo film unit, securing said specific front cover to said main body.

15. A producing method as defined in claim 14, comprising the further steps of:
producing said standard front cover by a common mold set and a first insert combined therewith, and
producing said specific front cover by said common mold set and a second insert combined therewith.

16. A producing method as defined in claim 15, wherein said photographing auxiliary device comprises a flash device.

17. A producing method as defined in claim 16, further comprising a step of securing a transparent outer cover to each one of said standard and specific front covers, wherein an opaque auxiliary sheet is disposed inside said outer cover.

18. A producing method of producing a lens-fitted photo film unit, comprising steps of:
securing a front cover to a main body pre-loaded with unexposed photo film;
providing a standard outer cover;
providing a specific outer cover on which a photographing auxiliary device is provided;
in producing a normal lens-fitted photo film unit, securing said standard outer cover to said front cover, and in producing a specific lens-fitted photo film unit, securing said specific outer cover to said front cover.

19. A producing method as defined in claim 18, comprising the further steps of:
producing said standard outer cover by a common mold set and a first insert combined therewith, and
producing said specific outer cover by said common mold set and a second insert combined therewith.

20. A producing method as defined in claim 19, wherein said photographing auxiliary device comprises a stop-down panel movable into and out of a photographic light path upon an external operation.

21. A producing method as defined in claim 19, wherein each one of said standard and specific outer covers is transparent;

further comprising a step of securing an opaque auxiliary sheet to an inside of said each one outer cover, wherein said stop-down panel is disposed between said each one outer cover and said auxiliary sheet.

22. A lens-fitted photo film unit production system, comprising:

a main body pre-loaded with unexposed photo film;

a standard front cover structured and arranged so that the standard front cover can be secured to a front of said main body; and a specific front cover, on which a photographing auxiliary device is provided, said specific front cover being structured and arranged so that the specific front cover can be secured to said main body;

wherein only one of said standard front cover and said specific front cover can be secured to the main body at one time.

23. A lens-fitted photo film unit as defined in claim 22, wherein said photographing auxiliary device comprises a flash device.

24. A lens-fitted photo film unit as defined in claim 23, further comprising:

a transparent outer cover secured to said front cover;

an opaque auxiliary sheet secured to an inside of said outer cover.

25. A lens-fitted photo film unit production system, comprising:

a main body pre-loaded with unexposed photo film;

a front cover secured to a front of said main body;

a standard outer cover structured and arranged so that the standard outer cover can be secured to said front cover; and a specific outer cover, on which a photographing auxiliary device is provided, said specific outer cover being structured and arranged so that the specific outer cover can be secured to said front cover;

wherein only one of said standard outer cover and said specific outer cover can be secured to the front cover at one time.

26. A lens-fitted photo film unit as defined in claim 25, wherein said photographing auxiliary device comprises a stop-down panel movable into and out of a photographic light path upon an external operation.

27. A lens-fitted photo film unit as defined in claim 26, wherein each one of said standard and specific outer covers is transparent;

further comprising an opaque auxiliary sheet secured to an inside of said each one outer cover, wherein said stop-down panel is disposed between said each one outer cover and said auxiliary sheet.

* * * * *

UNITED STATES PATENT AND TRADEMARK OFFICE
CERTIFICATE OF CORRECTION

PATENT NO. : 6,768,866 B2
DATED : July 27, 2004
INVENTOR(S) : Keiji Uchiyama

It is certified that error appears in the above-identified patent and that said Letters Patent is hereby corrected as shown below:

<u>Title page,</u>
Item [73], Assignee, change "Fuji Photo Co., Ltd." to -- Fuji Photo Film Co., Ltd. --.

Signed and Sealed this

Sixteenth Day of August, 2005

JON W. DUDAS
*Director of the United States Patent and Trademark Office*